…

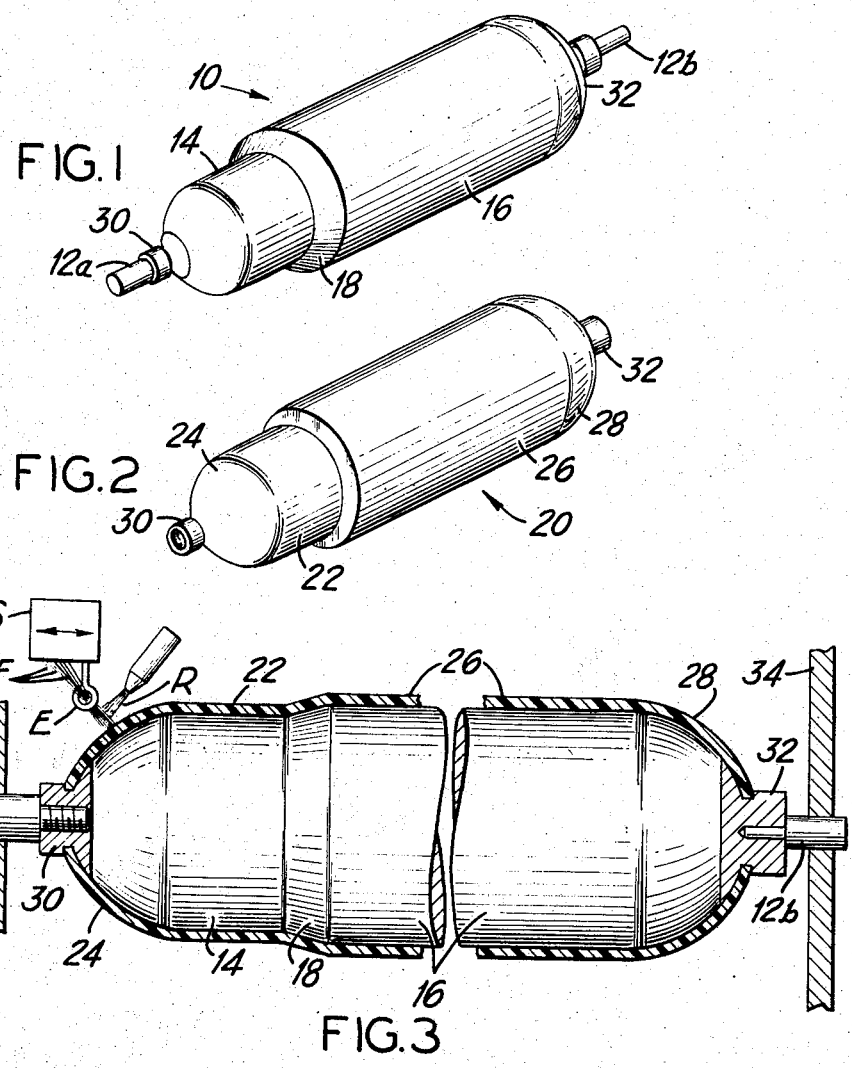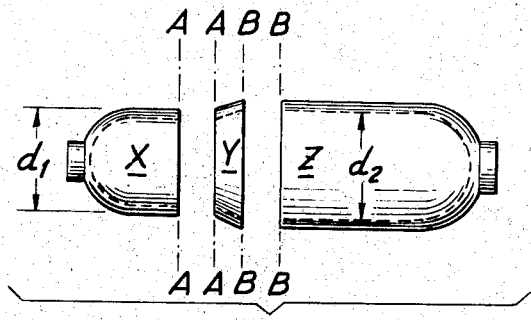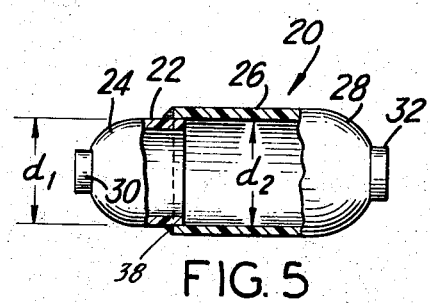

United States Patent Office 3,360,411
Patented Dec. 26, 1967

3,360,411
METHOD OF FORMING A HOLLOW CONTAINER OF WOUND FILAMENTARY MATERIAL
Warren E. Ponemon, Locust Valley, N.Y., assignor to Koppers Company, Inc., a corporation of Delaware
Filed Oct. 15, 1964, Ser. No. 403,973
9 Claims. (Cl. 156—175)

ABSTRACT OF THE DISCLOSURE

This invention relates to an improved method for filament winding a bottle formed of adhesively secured fibers and more particularly to the method of forming a low cost, two-part bottle having low pressure requirements. The two parts are assembled and adhesively united to form a unitary bottle.

---

Many techniques have been developed for forming pressure bottles, for example, by filament winding resin-bonded glass fibers. In general, however, the prior art is directed to such bottles having high pressure requirements which require unitary windings. Accordingly, the prior art methods are quite complex and costly since the mandrels can only be used one time.

The method of the present invention provides a low cost bottle of the type where the pressure requirements are relatively low and which do not dictate a unitary winding. The mandrel may readily be reused many times because the winding, as will be more fully explained hereinafter, is cut therefrom. Standard winding and bonding techniques well known in the industry are employed to form the bottle which may be provided with suitable end fittings in accordance with the demands of the application.

In the practice of the present invention, resin-bonded glass fibers are wound on a permanent mandrel having two different outside diameters. A tapered portion of the mandrel connects the two diameters. After the winding is completed and the resin is cured, the hollow shell is transversely cut to separate the two different diameters. The intermediate, tapered portion is then discarded. The mandrel is so dimensioned that the outside diameter of the windings covering the smaller mandrel diameter fits into the inside diameter of the windings covering the larger mandrel diameter. After having been cut from the mandrel, the two sections are cemented together with an epoxy resin, it being understood that the larger diameter winding overlaps and encases a portion of the smaller diameter winding. While the windings are not unitary in a bottle formed by the method of the present invention, this loss of inherent strength of glass fiber filaments is not deleterious due to generally low pressure requirements. Moreover, the strength loss is offset by the savings accrued from the use of a permanent or reusable mandrel.

Accordingly, it is an object of the present invention to provide a low cost method for fabricating a glass fiber, filament-wound bottle.

Another object is to provide a method for filament-winding a glass fiber bottle wherein a reusable mandrel may be employed.

An additional object of the present invention is to provide a method wherein a single continuous winding on a reusable mandrel is employed to fabricate a multidiameter bottle.

A further object is to provide a low cost method for winding a bottle on a reusable, multidiameter mandrel wherein a portion of the wound shell is discarded and the remaining portions nest within each other in the assembled condition.

These and other features, objects and advantages of the invention will, in part, be pointed out with particularity and will, in part, become obvious from the following more detailed description of the invention, taken in conjunction with the accompanying drawing which forms an integral part thereof.

In the various figures of the drawing, like reference characters designate like parts.

In the drawing:

FIG. 1 is a pictorial view of a multidiameter mandrel having end fittings positioned thereon.

FIG. 2 is a pictorial view of a finished bottle wound on the mandrel of FIG. 1 in accordance with the method of the present invention.

FIG. 3 is a cross sectional side elevation view schematically showing glass fiber filaments being wound on a mandrel.

FIG. 4 shows the various sections of the wound bottle in an exploded side elevation view after having been cut from the mandrel.

FIG. 5 is an assembled, partly cross sectioned side elevation view of those components of FIG. 4 required to form a complete bottle.

In FIG. 1, the mandrel 10 employed with the method of the present invention is pictorially illustrated. As will be explained in more detail hereinafter, longitudinal shafts 12a and 12b support the mandrel for rotation about its own axis. The mandrel itself is comprised of a first cylindrical portion 14, a second cylindrical portion 16, and an intermediate tapered portion 18.

The finished product or bottle 20 comprised of resin-bonded filament-wound glass fibers is shown pictorially in FIG. 2. Cylindrical portion 22, having a spherical end 24, was wound on mandrel portion 14 and cylindrical portion 26, also having a spherical end 28 was wound on mandrel portion 16. Metallic fittings 30 and 32 were integrally secured to ends 24 and 28, respectively, during the winding operation now to be described.

Referring now to FIG. 3, the first step in the method of the present invention is winding a layer of resin-bonded glass fibers on mandrel 10. End fittings 30 and 32 are temporarily secured to the ends of mandrel 10. Shafts 12a and 12b are positioned in the end fittings and the shafts are journaled in machine frame 34 for rotation about the mandrel axis by motor 36. By techniques well known in the art, filaments F are fed from a supply source S through a feed-eye E for placement on the surface of the mandrel. Concurrently with the rotation of the mandrel by the motor and the feeding of the fibers, supply source S is adapted to traverse the length of the mandrels to apply the fibers in a helical pattern. The fibers are bonded with an epoxy resin R just prior to their winding. Alternatively to the impregnating arrangement illustrated, the fibers may be passed through a liquid resin bath before their application to the mandrel. Still other impregnating methods known in the art may be employed without diminishing the scope of the present invention.

The so-called epoxide resins are presently preferred for the purpose of this application. Epoxide compounds are those compounds having an ether oxygen atom joined to two vicinal carbon atoms. The term "epoxide resin," as used in the present specification and in the appended claims, denotes the resinous reaction product of certain of these epoxide compounds and compounds having available hydrogen atoms linked to carbon atoms by oxygen atoms, as for example, polyhydric phenols and polyhydric alcohols. A particularly useful epoxide resin is the reaction product of an epihalohydrin and a polyhydric phenol, as exemplified by bisphenol-epichlorohydrin. Suitable epoxy resins include the reaction products of epihalohydrins and a polyhydric alcohol such as ethylene glycol, propylene glycol, trimethylene glycol and the like. Other equivalent epoxide resins are well known to those skilled in the plastics art.

Other suitable thermosetting resins include polyester resins, and in particular the alkyd resins comprising the reaction product or copolymers of polyhydric alcohols and dibasic acids. Typical of the large number of available polyester resins are the copolymers of phthalic anhydride and a polyhydric alcohol such as ethylene glycol, diethylene glycol or glycerin, maleic anhydride and a polyhydric alcohol, sebacic acid and a polyhydric alcohol, and diethylene glycol and bis-allyl carbonate. These and equivalent polyester resins are advantageously partially polymerized prior to their incorporation in the plastic composition, and may be modified in the manner known in the art by the admixture therewith of such modifiers as epoxidized oils and unsaturated fatty acids. If desired, suitable polyester polymerization catalysts well known to the art may also be included in composition.

Other thermosetting polymers that can be employed in the composition include the acrylic compounds, and the phenolformaldehyde, furfural-formaldehyde, and resorcinol-formaldehyde resins. Moreover, the thermosetting material need not be in every case what is commonly and rather loosely known as a "resin". For example, substances such as phthalic anhydride and diallyl phthalate may be employed as a thermosetting reactive material in the plastic composition.

The resin is cured after the winding operation has built up a sufficient thickness of glass fibers to form the wall of the bottle. At this time the hardened glass fibers and resin are transversely cut along lines A—A and B—B to define the three separate sections X, Y and Z, shown in FIG. 4. The transverse cuts of course are only deep enough to touch the outer surface of the mandrel, a suitable mold release agent having been applied thereto prior to winding. Of particular importance is the fact that dimension $d_1$, the outside diameter of cylindrical portion 22, is equal to dimension $d_2$ which is the inside diameter of cylindrical portion 26.

To assemble the bottle as shown in FIG. 2 and FIG. 5, the central tapered portion Y is discarded and the open end of cylindrical portion 22 is inserted into the open end of cylindrical portion 26. Fittings 30 and 32, which are now integral with the sperical ends 24 and 28, respectively, may be of any suitable design. An adhesive 38 is applied to the confronting surfaces of the two assembled, cylindrical portions to form a unitary bottle.

The method hereinabove described and illustrated as, by its nature, of low cost. The fabricating techniques, such as bonding, winding, curing and cutting, are all well known. The novelty of the present invention resides, in part, in dimensioning of the mandrel to provide the telescoping fit between the two cylindrical portions. While the invention has been particularly illustrated with transverse cuts to produce a central, discarded section, it is to be understood that the scope of the method would also encompass other types of cuts wherein it may not be necessary to discard any material. Regardless of the nature of the cut a first section having one outside diameter nests within a second section having a similar inside diameter. The method of manufacture is admirably suited to low pressure applications and assures that the mandrel may be reused after each winding operation.

It should be understood that the present invention is not limited to glass fibers but that other materials such as metal, nylon, etc., may be employed to wind the bottle. Similarly other bonding agents may be used in addition to epoxy resins.

For a further discourse on the subject of resins, reference is made to "Epoxy Resins" by Irving Skeist, Reinhold Publishing Corporation, New York, N.Y. Copyright 1958.

There has been disclosed heretofore the best embodiments of the invention presently contemplated and it is to be understood that various changes and modifications may be made by those skilled in the art without departing from the spirit of the invention.

What is claimed is:
1. The method of forming a hollow container comprised of adhesively bonded filamentary material, said method comprising the steps of:
   (a) winding the adhesively coated filamentary material on a mandrel having different sized diameters to form a shell whereby the outside diameter of one portion of the shell is less than the inside diameter of another portion of the shell;
   (b) cutting the wall of the wound shell to define at least two separate sections; and
   (c) securing at least two sections of the shell together in axial, end-to-end relationship to form a bottle, whereby the outside diameter of one of the sections fits into the inside diameter of another one of the sections.

2. The method of claim 1 including the step of applying an adhesive to the confronting end portions of the separate sections prior to securing the sections to each other.

3. The method of claim 1 including the step of cutting the shell transversely to the longitudinal axis thereof.

4. The method of forming a hollow, elongated container comprising the steps of:
   (a) winding a filamentary material on a rotating mandrel having different sized diameters to form a shell whereby the outside diameter of one portion of the shell is less than the inside diameter of another portion of the shell;
   (b) coating the winding with an adhesive to thereby bond the individual filament to each other;
   (c) curing the adhesive to form a rigid shell;
   (d) cutting the wall of the wound shell to define at least two separate hollow sections;
   (e) removing the section from the mandrel; and
   (f) securing at least two sections of the shell together in axial, end-to-end relationship to form a bottle whereby the outside diameter of one of the sections is fitted into the inside diameter of another one of the sections.

5. The method of claim 4 including the step of applying an adhesive to the confronting end portions of the separate sections prior to securing the sections to each other.

6. The method of claim 4 including the step of cutting the shell transversely to the longitudinal axis thereof.

7. The method of forming a hollow, elongated container comprising the steps of:
   (a) positioning at least one end fitting on a mandrel having two different axially spaced diameters and a tapered portion therebetween;
   (b) rotating the mandrel about the longitudinal axis thereof;
   (c) applying filamentary material to the mandrel to form a shell whereby the outside dimension of the first diameter is less than the inside dimension of the second diameter;
   (d) coating the filamentary material with an adhesive to thereby bond the individual filaments to each other;
   (e) curing the adhesive to form a rigid shell;
   (f) cutting the shell to define separate first and second hollow, circular sections having different diameters and a hollow tapered section;

(g) removing the sections from the mandrel; and (h) securing the two circular sections of the shell together whereby the outside diameter of the first section is fitted into the inside diameter of the second section.

8. The method of claim 7 including the step of applying an adhesive to the confronting end portions of the separate sections prior to securing the sections to each other.

9. The method of claim 7 including the step of cutting the shell transversely to the longitudinal axis thereof.

References Cited

UNITED STATES PATENTS

| | | | |
|---|---|---|---|
| 2,448,114 | 8/1948 | Olson et al. | 156—189 |
| 2,991,210 | 7/1961 | Matkovich | 156—175 |
| 3,203,845 | 8/1965 | Short | 156—175 |

EARL M. BERGERT, *Primary Examiner.*

P. DIER, *Assistant Examiner.*